(12) United States Patent
Alper

(10) Patent No.: US 6,805,727 B2
(45) Date of Patent: Oct. 19, 2004

(54) METHOD FOR FILTERING PERNICIOUS NON-GASEOUS CONTAMINANTS FROM AIR AND BENIGN GASES

(76) Inventor: Hal Alper, 6488 Ford Rd., Flowery Branch, GA (US) 30542

( * ) Notice: Subject to any disclaimer, the term of this patent is extended or adjusted under 35 U.S.C. 154(b) by 7 days.

(21) Appl. No.: 10/413,451

(22) Filed: Apr. 14, 2003

(65) Prior Publication Data

US 2003/0217640 A1 Nov. 27, 2003

Related U.S. Application Data

(60) Provisional application No. 60/373,666, filed on Apr. 18, 2002, and provisional application No. 60/457,957, filed on Mar. 27, 2003.

(51) Int. Cl.⁷ .......................... B01D 53/02; B01D 59/26
(52) U.S. Cl. .............. 95/90; 95/273; 95/285; 55/524
(58) Field of Search .................. 95/90, 116, 141, 95/273, 285; 55/524, 527, DIG. 24; 96/153

(56) References Cited

U.S. PATENT DOCUMENTS

| | | | |
|---|---|---|---|
| 4,316,730 A | 2/1982 | Eibl | |
| 5,213,689 A | * 5/1993 | Kafchinski et al. | .... 210/500.23 |
| 5,437,793 A | 8/1995 | Alper | |
| 5,698,139 A | 12/1997 | Alper | |
| 5,746,925 A | 5/1998 | Alper | |
| 5,837,146 A | 11/1998 | Alper | |
| 5,961,823 A | 10/1999 | Alper | |
| 6,180,010 B1 | 1/2001 | Alper | |
| 6,337,016 B1 | 1/2002 | Alper | |
| 6,475,393 B2 | 11/2002 | Alper | |
| 6,491,822 B2 | 12/2002 | Alper | |

* cited by examiner

*Primary Examiner*—Frank M. Lawrence
(74) *Attorney, Agent, or Firm*—Klauber & Jackson

(57) ABSTRACT

A method for separating undesired particles from a gaseous medium in which the particles are dispersed. The particles and gaseous medium are passed through a fluid-pervious filtration media which has been infused with an absorbtion composition comprising a homogeneous thermal reaction product of an oil component selected from the group consisting of glycerides, fatty acids, alkenes, and alkynes, and a methacrylate or acrylate polymer component. The particles are thereby immobilized at the media. The purified gaseous medium having passed through the filtration media is collected and flowed to a utilization or discharge point.

20 Claims, 6 Drawing Sheets

METHOD FOR FILTERING PERNICIOUS NON-GASEOUS CONTAMINANTS FROM AIR AND BENIGN GASES

RELATED APPLICATION

This application claims priority from provisional Application No. 60/373,666 filed Apr. 18, 2002, and Application No. 60/457,957 filed Mar. 27, 2003.

FIELD OF THE INVENTION

This invention relates generally to apparatus and methods for removing contaminating mists and particulates from gases in which such agents are dispersed, and more specifically relates to filtration devices and methods for removing oil mists and other organic vapor mists, as well as other solid and liquid particles from airstreams in which they are dispersed and/or with which they form an aerosol.

BACKGROUND OF INVENTION

Oil mist and organic vapor mists are very difficult to capture once airborne. By the term "mist" is meant a dispersion in gas (typically air) of liquid droplets sufficiently small to form a true suspension under ambient conditions, as well as dispersals of droplets above such size. Many industrial operations generate such oil mists, airborne hydrocarbon mists and volatile organic compound (VOC mists), resulting in harmful and costly pollution. Such pollution can affect indoor/outdoor air quality and create odor problems, generate HVAC/heat exchange fouling, cause gross contamination of roof-tops, and generate hazardous stormwater run-off and ground water contamination. Facilities experiencing these problems include metal working operations (machining and tooling), surface coating operations (solvent-based industrial painting), auto manufacturing operations, and oil refining and chemical production operations. Similarly compressors or the like associated with HVAC systems of buildings or even sea vessels often introduce oily mists into the HVAC system, and ultimately into the ambient environment.

In addition to liquid droplets of the type discussed above, solid particles dispersed in gases such as air, represent further common contaminants which contribute to pollution, and are often sought to be removed. Such solid particles are often present along with separate liquid droplets or particles. In other instances the liquid and solid particles can be present as combined entities, e.g., where the solid particles are enveloped or coated by the liquid.

A more general concern arises where one is concerned with filtration of complex waste streams where oil mist and suspended solid particles are present simultaneously, either as or with true aerosols and in the presence of suspended particulate matter which has been rendered static dissipative and/or neutral, which reduces the strength of the van der Waal's affinities. Conventional adsorbents and filter media rely heavily on such van der Waal's forces and other so called weak molecular interactions in order to perform as expected.

Conventional treatment methods of air streams contaminated with low concentrations of volatile organic compound (VOCs) mists, hydrocarbon and/or oil vapor mists, are expensive, complicated and difficult to operate. Yet many industries generate such air streams which must therefore be treated to meet the requirements of the Montreal Protocol and Clean Air Act Amendments of 1990. Conventional treatment technologies for removal of low mist concentrations from air streams include intense physical or chemical process such as multi-layer adsorption, catalytic conversion and photolytic degradation. Attempts have been made using bioscrubbers and/or an air phase bioreactors to remove hydrocarbons, but they are only able to achieve up to 75% removal because of flowrate/contact time issues, and performance varies significantly depending upon superficial gas velocity, gas inlet concentration, mass transfer coefficients and biokinetic constants.

In 1995, to comply with new EPA standards for organic air emission for hazardous waste treatment, storage and disposal facilities (TSDF's) and hazardous waste generators, Lawrence Livermore National Laboratory (LLNL) designed an organic removal and destruction treatment train to modify its existing wastewater treatment tank farm and achieve 95% TOC reduction. It consists of an air stripper, high-efficiency particulate air filter (HEPA), catalytic oxidizer, scrubber and mist eliminator.

The original high performance filters referred to as HEPA (High Efficiency Particulate Arrestors) were developed during the Manhattan project to prevent discharge of radioactive particles. Since then they have become the preeminent technology when high efficiency filtration is required in industry, medicine, military applications and more recently for household filtration devices. HEPA filters are composed of submicron glass fibers. A HEPA filter by definition will have a 99.97% particle removal efficiency for all particles of 0.3 micron diameter. HEPA filters exhibit higher efficiency for both smaller or larger particles. HEPA filters have high pressure drop performance characteristics and usually require a prefilter for optimum performance.

Similarly, work has been done with granulated activated carbon (GAC), but it has numerous well-known drawbacks such as clogging, re-release and absorption capacity. Utilizing zeolites in multi-layer design with GAC, while generally effective, is expensive and multi-layers cause large pressure drops ($\Delta P$) across filters based upon these combinations.

For purposes of this specification the term "dispersed" in reference to any of the several above types of particle/gas systems means that the mist, or solid particles etc. are dispersed in a gaseous phase such as air. The term "aerosol" can be defined as a system of solid or liquid or liquid-enveloped solid particles suspended in a gaseous medium, the particles having a negligible falling velocity.

Aerosols are further characterized herein by having liquid or solid (or combined liquid/solid) particles of less than 100 microns diameter. In a typical distribution, at least 40% by weight of the particles are less than 0.2 micron. At this size, assuming low surface charge which inclusion of organic and ionic compounds will promote, these droplets and/or particulates will stay buoyant in air indefinitely. The strength of the surface tension in a droplet is more than 100,000 times the mass of the droplet. Unless the droplet is opened, the pollutants entrapped inside remain inaccessible. It is been shown that when liquid aerosols are recirculated through a filter the droplet size distribution becomes much narrower and tends towards the smaller micron ranges. In other words if a liquid aerosol is not adsorbed onto a filter surface, smaller more robust droplets are formed with much higher surface tension to mass ratios.

Aerosols are formed spontaneously under ambient conditions in multiple ways. Particulate matter provides nucleation centers around which liquids and organic compounds self-assemble. Human activities like talking, breathing, and sneezing create liquid aerosols. This is the vector for transmission for all cases of tuberculosis. Movement provides particulate nucleation centers and household systems which move air create oily aerosol droplets. Other pollutants spontaneously coalesce and adhere to these initial aerosol droplets.

Air pollution in fact exists in many forms and each of these have different surface characteristics and affinities. A somewhat more complete picture of the complex interactions which occur in air is as follows:

Primary mechanisms of air pollution formation include:
1. Formation of volatile organic compounds through evaporation and incomplete combustion.
2. Biological generation of volatile organic compounds.
3. Formation of liquid aerosol droplets through shear and turbulence related processes, from cooking and household solvent based cleaners.
4. Anthropomorphic generation of particulate aerosol.
5. Biological formation of particulate aerosols through decomposition and spore formation.
6. Particulate aerosol formation from geological and weather based phenomena.

Secondary mechanisms of air pollution formation include:
1. Condensation—Liquid aerosol droplet formation due to condensation of gaseous phase components.
2. Adsorption—Adsorption of gaseous phase and liquid aerosol components onto particulate surfaces resulting in particulate aerosols with modified surfaces from adsorption of organic compounds and hydrous inorganic phases.
3. Nucleation—Liquid aerosol formation through precipitation onto micro particulate nucleation sites.

The above sources and processes will result minimally in the following general categories of airborne pollutants based on surface characteristics and affinities. This is important because the components of a filtration device must have complementary affinities:
1. Particulate aerosol (charged or polar surface)
2. Particulate aerosol (neutral or conductive surface)
3. Liquid aerosol (organic)
4. Liquid aerosol (hydrous)
5. Liquid aerosol (mixed)

Ambient air pollution is a hydra-like beast. Mechanisms such as adsorption, nucleation and condensation are capable of producing a variety of airborne species with different surface affinity and bulk characteristics. Some of the forms of ambient air pollution documented to date are as follows:

1. Dry and hydrous carbonaceous material resulting from anthropomorphic and natural processes.

2. Inorganic micro particulates such as aluminium oxide, silicates and other compounds resulted from geological processes.

3. Spores, pollen seeds of biological origin.

4. Endotoxins and other detritus resulting from biological decomposition processes.

5. Liquid non polar aerosols (all liquid).

6. Liquid polar hydrous aerosols (all liquid).

7. Liquid aerosol with particulate nucleation sites.

8. Particulate aerosol with adsorbed non polar liquid organic constituents on surface.

9. Particulate aerosol with adsorbed hydrous liquids (polar).

10. Particulate aerosol with mixed emulsion of hydrous and non polar constituents.

It is much harder to remove pollutants which are entrapped in aerosol droplets than it is to remove single source free flowing compounds. The filter material must have complementary affinity for the surface of the suspended aerosol in order to entrap particulate aerosol material and in the case of liquid aerosols in order to reduce the surface energy at the interfacial membrane in order to expose the pollutants entrapped within the droplets.

In the case of the particulate aerosols the most difficult to remove tend to be less than 3 microns in size and to have a neutral or insulating surface. In this case filtration efficiency can be increased by modifying the filter substrate surface to have affinity for the non polar particle surface. Without filter affinity if one relies wholly on physical filtration mechanisms untenable differential pressures quickly develop across the system.

Most air filters are porous fibrous materials with fibers aligned perpendicular to air flow. Fiber diameters are typically less than 0.50 mm and the resultant interfibrous spaces are usually much larger than the airborne pollutants to be filtered out. More than 90% of the filter volume is void space. Direct interception does not occur frequently. At particle sizes smaller than 0.6 micron Brownian diffusion is the predominant filtration mechanism with electrostatic interactions having an effect in some cases. At over 0.6 micron inertial impaction and gravity settling predominate. In 1942, Irving Langmuir calculated the particle size where the contribution of the above effects would be at a minimum. The result of this theoretical calculation was that minimum filter efficiency would occur at 0.3 micron. Consequently filters are still evaluated based on performance at the point of minimum efficiency as calculated by Langmuir. Interestingly many of the air filter performance standards and analytical techniques and equipment employed today were developed during World War II as a part of personal protective mask research and chemical fog and chemical warfare research in addition to development of HEPA filters (High Efficiency Particulate Arrestors) for capture of radioactive materials.

Due to this early work and subsequent research air filter performance has become better understood. Standardized tests have been developed to gauge filter performance. One of the more common standards which is utilized is the MERV (Minimum Efficiency Reporting Value) rating system based on ANSI/ASHRAE 52.2-1999. (ASHRAE refers to the American Society of Heating, Refrigeration, and Air Conditioning Engineers) In this system filters are evaluated based on performance in regard to several observables. Among them are Dust Spot Efficiency, Minimal Final Pressure, Particle Size Efficiency, Average Arrestance, Dust Holding Capacity and Penetration. Filters are assigned a value from 1 to 16 in increasing order of efficiency and discrimination. MERV 1 rated filters are generally throw-away materials meant for filtration of bulky mass, MERV 16 filters are capable of removing all bacteria and even fine aerosol such as smoke. In this application references may from time to time be made to filter performance as it relates to "Dust Holding Capacity," "Arrestance," "Pressure Drop" and "Dust Spot Efficiency." These terms are defined as follows:

"Arrestance" is a gravimetric measure of the ability of a tested filter to remove injected synthetic test dust from the test air, expressed as a percent of test dust by weight that a filter is able to capture. "Dust Holding Capacity" is determined by the product of the quantity of synthetic test dust fed to the test filter, expressed in grams, and its average Arrestance. It measures the weight of test dust a filter can hold at a final pressure drop.

"Dust Spot Efficiency" is a measure of the ability of the filter to remove atmospheric dust from the test air. The method of determining this quantity is based upon light transmission through previously evaluated target paper. This is accomplished by adjusting the ratio of quantities of air sampled through targets upstream and downstream of the test filter so that equal changes in light transmission occur. The ratio is converted to an efficiency which is expressed as a percent. A high dust spot efficiency results in a high resistance to staining.

"Caking" is the build up of particulate material on the filter surface. Typically when caking occurs percent penetration decreases and Holding Capacity increases However $\Delta$ P also increases drastically indicating the end of the useful lifetime of the filter.

"Pressure Drop" is a measure of a filter's resistance to airflow and is expressed herein as "Delta P" (or "$\Delta P$"). It is a measure of the differential pressure across the filter and is usually expressed in units of inches of water. Typically a $\Delta P$ of 1.6–1.7 inches of water is the maximum pressure drop at which point testing generally stops. It has in the past been considered a basic axiom in air filtration that as filter efficiency and filter capacity increase pressure drop also increases. It is also true that percent penetration is detrimental to filter performance and decrease in percent penetration usually results in increase in Δ P. Therefore, a long standing objective in air filtration research has been to increase Holding Capacity, minimize penetration, and delay the onset of caking, while keeping Δ P relatively constant.

Over the years a variety of techniques have been employed, and proposed to achieve the above objective. Tacking agents added to the filter have been utilized with mixed results. Among the types of materials which have been employed as tacking aids are rubber latex, polyisobutylene and a variety of viscous oils. Tacking agents tend to cause increases in pressure especially upon capturing particulates and Dust Holding Capacity drops significantly at the incidence of the caking point. This decrease in Holding Capacity in many cases is greater than the equivalent filter displays without a tacking agent. Electrostatic charging of filter substrates is often utilized. Although this type of filter exhibits some improvements in performance, it suffers from an unfortunate phenomena where it displays decrease in penetration during the early stages of loading. Additionally, oil mists and water condensation reduce the effectiveness and lifetime of the corona effect.

SUMMARY OF INVENTION

Now in accordance with the present invention, it has unexpectedly been found that the compositions disclosed in the present inventor's U.S. Pat. Nos. 5,437,793; 5,698,139; 5,837,146; and 5,961,823 (all of which disclosures are hereby incorporated by reference), have extremely strong affinities for the aforementioned mist contaminants and other dispersed and/or aerosol particles in air and gas streams; and that when such streams containing these contaminant particles are passed through fluid-pervious filtration media incorporating these inventive compositions, the contaminants are immobilized at the media, as a result of which concentration levels of the contaminants in the stream filtrate may be reduced to very low values, in some instances below detectable limits in a single pass.

Filter configurations incorporating the said compositions (hereinafter referred to as "absorbent compositions" or "viscolastic tackifiers" ("VET")), may be based on various air or gas stream permeable substrates, such as shredded, spun or otherwise configured polypropylene, polyethylene or shredded or spun cellulose, or polyester cellulose which substrates are infused or otherwise treated with the absorbent compositions, which are then cured to produce the surface modified filter. Similarly the said absorbent compositions can be incorporated into or upon other filtering substrates and media, such as paper, including compressed pulp materials, particulate porous foamed plastics, fiberglass, mineral particulates such as perlite and vermiculite, and particulate, fibrous or porous ceramic media. The resulting substrate filter may be used independently to treat an air or other gas stream from which contaminating mists or other dispersed or suspended particles are to be removed, or can be used (especially for removal of mists) in conjunction with a conventional filter, as for example by being placed in front of (i.e., in series with) the conventional filter through which the air or gas stream passes.

In general almost any conventional air or gas filtration media will be improved in performance by surface modification of the media in accordance with the invention. Filter media treated with a dry curable VET in accordance with the invention are unexpectedly found to exhibit increase Holding Capacity at little or no additional Pressure Drop and without accelerating the onset of caking. Typical tests indicate that treatment with VET absorbent compositions in accordance with the invention can improve filter performance by 2 or more MERV ratings without any significant increase in Δ P. Additionally it appears that the treated filter does not exhibit significant Δ P even after the onset of caking, further increasing Holding Capacity.

It should be appreciated that the use herein of the term "absorbent composition" or "VET" is one of convenience for identifying the compositions of my aforementioned patents and patent applications. The specific mechanism by which the mist, and other liquid or solid contaminant particles are removed from the gas streams by conjunctive use of the "absorbent compositions" is not completely understood, and could include attachment and/or fixation of such contaminants by mechanisms which technically involve various physical and/or chemical interactions. The terms "absorbent composition" or "VET" as used herein are intended to encompass all of these possible mechanisms.

BRIEF DESCRIPTION OF DRAWINGS

The invention is diagrammatically illustrated, by way of example, in the drawings appended hereto, in which.

DESCRIPTION OF PREFERRED EMBODIMENTS

Figure 1:
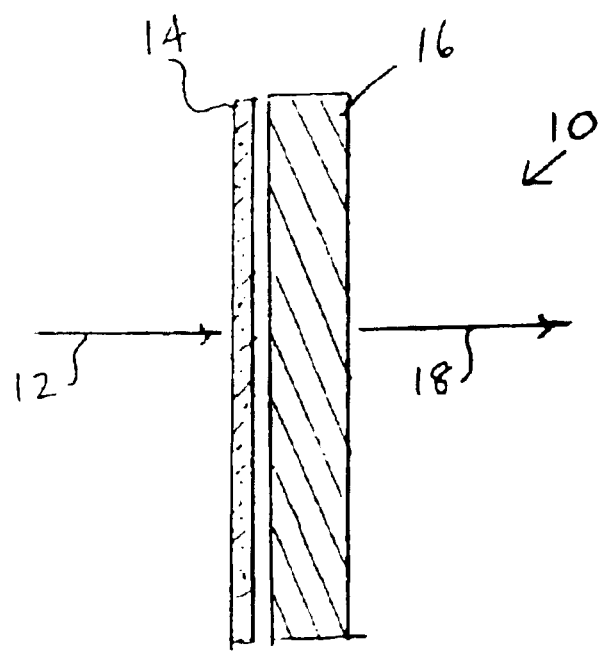
FIG. 1 is a schematic block diagram of one embodiment of a filtration system based upon the invention.

In FIG. 1 a representative filtration system 10 is shown which utilizes the principles of the present invention. An air stream 12 assumed to contain an undesired aerosol an example of which is an oily mist proceeds to the right in the sense of the drawing. In the prior art this stream would normally be passed directly through a conventional fabric or other gas permeable filter 16, numerous types of which are well-known in the art. In accordance with the present invention, however, a mist and particulate absorbing filter 14 is positioned as a "prefilter" directly in front of a conventional filter 16, so that the air stream proceeds in series through the successive filters, the purified stream exiting at 18. The mist absorbing filter 14 is based upon surface modified filtration media comprising substrates such as mentioned above, which have been infused with or otherwise carry absorbent compositions of the types taught in my aforementioned patents and patent applications. The absorbent composition will be present as from 0.05 to 10% by weight of the dried and cured filter, with 0.1 weight % being typical. An infused substrate suitable for use as the filtration media can, e.g. be prepared from shredded cellulose, such as the Absorbent GP material available from Absorbent Corporation of Bellingham, Wash. The shredded material is treated with an absorbent composition in a manner which will be set forth below. Similarly the substrate material can comprise a fibrous polyester cellulose or a nonwoven polypropylene. The resulting filters can be considered as chemical affinity filters which are produced by incorporation and curing of the viscoelastic oleophilic surfactant polymer absorbent compositions referred to in my aforementioned patents onto the desired filter substrate. Other utilizable materials include the INTREPID® thermally bonded together polyolefin fiber product of Kimberly-Clark, and the ULTI-MET® meltdown product of the same manufacturer. Once the filter substrate has been modified it exhibits enhanced ability to attract and hold on to particulates and to absorb oily droplets dispersed as aerosols without significant increase in Δ P of the filter. Depending upon the application filter 14 may be used as a "prefilter" (as in the Figure) or may be used as the sole filter for the air or gas streams aerosols.

The absorbent composition disclosed in the first of my aforementioned patents, i.e. U.S. Pat. No. 5,437,793, is characterized therein as a coagulant product which comprises a glyceride such as linseed oil reacted with a polymer such as poly (isobutyl methacrylate) which is then diluted with a solvent, such as 2,2,4-trimethyl-1,3-pentanediol monoisobutyrate. The composition formed by the thermal reaction of the linseed oil with the isobutyl methacrylate polymer is a soft resinous product which, when diluted with a solvent, results in a mixture that in the teaching of the said patent can be sprayed onto an oil spill or otherwise introduced to the oil spill to coagulate the oil. Additionally, however, and as disclosed in my further U.S. Pat. Nos. 5,698,139, 5,837,146 and 5,961,823 above cited, further experimentation has led to the discovery of additional absorbent compositions produced from polymers and a variety of natural animal and vegetable oils, fatty acids, alkenes and alkynes, which absorbent compositions are all utilizable in the filters and filtration processes of the present invention. More generally these latter compositions are the thermal reaction product of a polymer component with an oil component selected from the group consisting of glycerides, fatty acids, alkenes and alkynes. The reaction conditions can be adjusted to provide a "first endpoint" product or a "second endpoint" product. Preferred compositions are disclosed which comprise the thermal reaction products of methacrylate polymers with a glyceride derived from a variety of natural animal and vegetable oils, or the thermal reaction products of methacrylate polymers with a fatty acid or alkene or alkyne containing from about 8–24 carbon atoms. The combination of a methacrylate polymer component with any of these oil components can provide either a first or second endpoint product, depending upon the reaction conditions. The term "first endpoint product" is used to describe the solubility product of the reaction which is a cooperative structure held together by many reinforcing, noncovalent interactions, including Van Der Waals attractive forces. The term "second endpoint product" is used to describe the product of the reaction which is the result of covalent bond formation between the polymer component and the oil component, as indicated by the change in molecular weight.

The absorbent composition is readily synthesized from a polymer component and an oil component selected from the group consisting of glycerides, fatty acids, alkenes and alkynes. In a preferred embodiment, the product is synthesized from an isobutyl methacrylate polymer, and the oil component is one derived from a natural oil, such as linseed oil, safflower oil, or sunflower oil. Optionally, the composition is then diluted with a solvent, such as 2,2,4-trimethyl-1,3-pentanediol monoisobutyrate or acetone. The diluted composition can then be applied to a desired substrate for use as a filtration media pursuant to the present invention.

The polymer component of the absorbent composition is a synthetic polymer such as polymers derived from methacrylates. Preferably, the polymer is derived from methyl methacrylate, ethyl methacrylate, isobutyl methacrylate, or n-butyl methacrylate, or may be a copolymer containing a methacrylate polymer. Most preferably, the polymer is a poly(isobutyl methacrylate) polymer such as that obtainable from ICI Acrylics as ELVACITE® 2045, or a methacrylate/methacrylic acid copolymer such as ELVACITE® 2008 or 2043. However, it is anticipated that other equivalent polymers can be used to prepare equivalent compositions of the invention. Combinations of polymers can be used to advantage in the preparation of the absorbent compositions.

The test used to determine whether or not a polymer can be used in preparing the absorbent compositions of the present invention is to combine the polymer component in question with the oil component, as set forth herein, to see if the resultant combination forms a homogenous product after heating. Ideally, the polymer component percentage of the composition should range from about 15–75%, preferably 20–40%, or more preferably from about 25–35%, by weight.

In one embodiment of the absorbent composition, the oil component of the composition is a glyceride derived from oils of vegetable or animal origin. Vegetable oils are obtained by cold pressing the seeds of a plant to obtain the oil contained therein. Of the vegetable oils, drying oils such as sunflower, tung, linseed, and the like; and semi-drying oils, such as soybean and cottonseed oil, have been shown to be useful as the glyceride component of the invention. Animal oils, such as, for example, fish oil, tallow and lard can also be used as a glyceride component of the composition. It is anticipated that any drying oil or semi-drying oil will work in the composition. Generally, a drying oil is defined as a spreadable liquid that will react with oxygen to form a comparatively dry film. Optionally, combinations of two or more glycerides can be used as reactants with the polymer to provide absorbent compositions useful in the present invention.

In a preferred embodiment, the oil component of the absorbent composition is a glyceride derived from a drying oil, such as linseed oil, that can be obtained from Cargill, Inc. as Supreme Linseed Oil, or safflower or sunflower oil. The glyceride should comprise from about 25–85%, preferably about 60–80%, and most preferably, from about 65–75% of the coagulant composition. All percentages in this disclosure are by weight, unless otherwise stated.

Where the oil component of the composition is a fatty acid or alkene or alkyne utilized as the reactant with the polymer, it contains from about 8 to 24 carbon atoms, and preferably from about 10 to 22 carbon atoms. Such fatty acids, alkenes and alkynes are commercially available from many suppliers. Typical fatty acids include both saturated and unsaturated fatty acids, such as lauric acid [dodecanoic acid], linolenic acid, cis-5-dodecanoic acid, oleic acid, erucic acid [cis-docosanoic acid], 10-undecynoic acid, stearic acid, caprylic acid, caproic acid, capric acid [decanoic acid], palmitic acid, docosanoic acid, myristoleic acid [cis-9-tetradecenoic acid], and linoleic acid. Typical alkenes and alkynes contain at least one and preferably one or two degrees of unsaturation, and from about 8 to 24 carbon atoms, with 10–20 carbon atoms being preferred. Preferred alkenes and alkynes are those such as 1-decene, trans-5-decene, trans-7-tetradecene, 1,13-tetradecadiene, 1-tetradecene, 1-decyne, and 5,7-dodecadiyne.

The absorbent composition is a product with characteristics different from either of the starting materials or a simple mixture of the two starting materials, thus showing that a new composition is produced by the thermal reaction. Specifically, the oil/polymer absorbent compositions pass a clear pill test after being heated at the elevated temperatures and do not separate into two parts upon being cooled but, rather form a homogenous, uniphase compound.

More specifically, the solvent can be selected from aliphatic hydrocarbons, aromatic hydrocarbons, alcohols, ketones, ethers, aldehydes, phenols, carboxylic acids, synthetic chemicals and naturally occurring substances.

The absorbent composition used in the present invention is prepared by a thermal reaction process. The first step of the process involves heating the oil component (glyceride or fatty acid or alkene or alkyne) to approximately 235–350° F. at a rate of about 5° F. per minute with continuous stirring. Then, the polymer component, usually in powdered form, is slowly stirred into the heated oil component. Depending upon the particular reactants used, the oil component should range from about 25–85%, preferably about 65–80%, more preferably about 72–77%, and the polymer should range from about 1–50%, preferably about 20–40%, more preferably about 23–28%, of the coagulant composition. After this mixture has been mixed properly, the mixture should be heated to approximately 400–700° F., depending on the particular components utilized for the reaction, and the desired endpoint of the reaction. Typically, reaction temperatures below about 500° F. produce "first endpoint products" while temperatures above about 500° F. produce "second endpoint products" The mixture should be heated at that temperature until a clear pill test indicates that the reaction has reached its first end point, i.e., a drop of the reaction mixture when placed on a clear glass plate is clear. When a clear pill test indicates that the reaction has reached its first end-point, the mixture should be cooled to a temperature below 200° F., generally about 180° F. After cooling, the coagulant product can be diluted with a suitable solvent to form a more liquid product that is easier to handle and use. The temperature at which the solvent is added is not critical, but the solvent should be added at a temperature where the coagulant composition is still pliable and the solvent will not rapidly evaporate.

Two reactions appear to occur between the oil component and the polymer component based upon the temperature and time. The first endpoint of the reaction results in a rubbery viscoelastic, relatively soft product with a melting point in the range of 100° F. to 250° F. This first endpoint product is homogeneous and does not separate upon melting or dissolution. This reaction occurs at 350° F.–500° F. This is designated the "first endpoint product" (solubility product).

In the second reaction, the polymer undergoes complete or partial chain fission into discrete polymer free radicals at a temperature above about 500° F. At between 350° F. to 500° F., it is believed that partial chain fission of the polymer component (isobutylmethacrylate polymer has a m.w.=300,000 Daltons) occurs at the end of the chain or in the middle. This results in a lower molecular weight product. It is believed that there may also be a solubility reaction occurring (similar to Sn and Pb forming solder) within the ternary composition. The occurrence of a chemical reaction is confirmed, however, due to the change of molecular weight.

Reactions at above 500° F. and up to 900° F. maintained at temperature from 5 minutes to 20 hours, depending on activation energy of compositions, result in the second endpoint product. This reaction is visually observable by color, rheology, and specific heat change in the product [Note: For the first endpoint product the end of the reaction is observed by change in color and a rheology change and the cessation of solution outgassing. There is also a change in specific heat as measured by Differential Scanning Calorimetry]. The second endpoint product has a weight average molecular weight in the range of about 62,000 Daltons which is consistent with complete chain fission of the polymer, resulting in smaller free radicals which results in a lower molecular weight compound. The melting point of these products is usually above 300° F. if the oil component is highly unsaturated, which results in a solid product due to the formation of highly bonded three dimensional densely packed molecular matrix. If the oil component has a low degree of unsaturation, the resultant product is usually liquid, which is consistent with this type of reaction.

The oily component and the polymer component are reacted in a thermal reaction that does not appear to be sensitive to the atmosphere under which the reaction is carried out, i.e., whether it is an inert, oxidizing or reducing atmosphere. Absorbent compositions have been prepared by this reaction which range from soft to hard, and elastomeric to brittle in nature depending upon the ratio of the oil component to the polymer component and the choice of the polymer component and/or the oil component used. If the reaction mixture separates into two phases upon cooling it is not useful for the invention. In this manner, any polymer can be identified for use in the invention.

The mechanism of the thermal reaction remains to be elucidated. While not wishing to be bound by any theory in this regard the reaction appears to be a polymerization or phase transition reaction brought about by heat and which is stable at lower temperatures. It is hypothesized that the elevated temperatures create monomer free radicals of the polymers and copolymers which then crosslink with the unsaturated glyceride molecules. It is also hypothesized that perhaps a phase transition is occurring between the oil component and the polymer component. In an effort to determine what type of interaction or reaction is occurring between the oil component and the polymer component, thermal analysis of several of the absorbent compositions was conducted. The results indicate that a reaction is occurring between the oil component and the polymer.

Differential scanning calorimetry (DSC) was thus performed on several such compositions. DSC is a thermal analysis technique that measure the quantity of energy absorbed or evolved by a sample in calories as its temperature is changed. The sample and a reference material are heated at a programmed rate. At a transition point in the sample's heating, such as when it reaches a melting point, the sample requires more or less energy than the reference to heat. These points are indicated the typical DSC readout.

Samples were taken at the beginning of the reaction procedure described earlier and at the end of the reaction. The DSC profile for the initial starting materials is dramatically different from the profile of the product. The initial profile showed two exothermic events when the DSC analysis is carried out from 40–280° C., one event occurring at about 100° C. and the other at about 217° C. In the DSC profile of the reaction product, however, there was only one exothermic event, occurring at about 261° C. The samples were taken at initial and final points during the reaction and allowed to cool to room temperature before being subjected to the DSC.

In the instance of a further reaction, DSC's of the starting materials and final product were obtained. Again, the DSC curves generated show that two thermal events occurred for the "just mixed" reactants while only one thermal event occurred for the final product. Thus, the DSCs indicated that the occurrence of a reaction or phase transformation. Similar evidence obtained from IR spectra analysis also confirms that the absorbent compositions used in the invention are distinct products from the reactants used to prepare the absorbent compositions.

EXAMPLE 1

In order to prepare a filter substrate for use in accordance with the invention, an infusion solution is prepared from a suitable solvent and the absorbent composition. In this example a solution was prepared from 90 w/w 99.9% acetone and 10 w/w absorbent composition which is the reaction product of 31% isobutyl methacrylate, 31% ELVACITE 2045, and 66% linseed oil. The absorbent composition is added to a closed explosion-proof mixer with the acetone and mixed for 12 hours or until the solution becomes homogeneous. The substrate in this Example was a non-woven polypropylene, viz. the VERASPUN material of Yarorough & Co., Inc. of High Point N.C. This material has a weight of 1 oz./square ft. The substrate material was immersed in the infusion solution until saturated, then removed and excess liquid allowed to drip off. The material was then placed in a convection oven at 110 to 120° F. until acetone free. The material was then cured at room temperature for one week. The resulting material was then shredded and subsequently used in filter configurations.

EXAMPLE 2

Hydrocarbon Air Filter Cloth Field Test

In this Example the VERSIPAD product of Mycelx Technology Corporation was used as the starting material for the mist filtration media. The VERSIPAD product is prepared substantially as described in Example 1.

Test: VERSIPADS were unfolded and stapled to conventional commercial air filters [Flanders Precision Aire® Prepleat, 20"×20"×2"]. These conventional filters [made from non woven cotton/synth blend fiber] were covered with a single ply of the VERSIPAD material (hereinafter referred to as "MYCELX Filter Cloth" installed in an industrial York roof-top HVAC unit and observed at day 7, day 30, and day 45 following installation. The primary (conventional) filters in such installation typically last 30 days until saturation with oil, and they run for another 30 days (60 days total) until oil leaks out of the HVAC onto the roof. This causes catastrophic failure of the HVAC unit's heat transfer ability and irreversibly fouls and corrodes heat exchanger coils.

Data:

Three 1-ply MYCELX Filter Cloths (17"×20") captured 138.21 g oil and grease by day 45, heaviest 1-ply=48.77 g. captured.

1 MYCELX VERSIPAD (18.2 ft$^2$.)=46.69 g.

MYCELX Filter Cloth (17"×20")=2.36 ft$^2$.

Results:

MYCELX Filter Cloth (Unused)=(46.69/18.2 ft$^2$)=2.5 g/ft$^2$.

MYCELX Filter Cloth @ 45 days=(48.77 g/2.36 ft$^2$)= 20.66 g/ft$^2$.

The MYCELX Filter Cloth therefore captured roughly 20 times its weight by day 45 before trace breakthrough of oil onto the primary filter. From this it will be evident that a 10-fold projected increase of the service life of the primary filter was achieved with a 30 day change out of the MYCELX Filter Cloth. One VERSIPAD can therefore protect 8 primary filters (8 Mycelx Filter Cloths/Versipad). The maximum life of a single-ply Versipad Filter Cloth is estimated at 45 days due to structural integrity and breakthrough point. Changing the MYCELX Filter Cloth at 30 days would extend the primary filter life 10-fold while minimizing fouling of the heat exchanger coils and eliminating oil run-off from the HVAC onto the roof.

In order to be robust an air filter must be able to respond to sudden high concentration influxes without significant $\Delta P$, and must be able to perform effectively in complex environments especially those containing oily mists. Additionally the filter substrate must have affinity for both charged and non charged particulate matter and for the surface membranes of electrically neutral oily droplets.

EXAMPLE 3

Particulate Filtration

Figure 2:
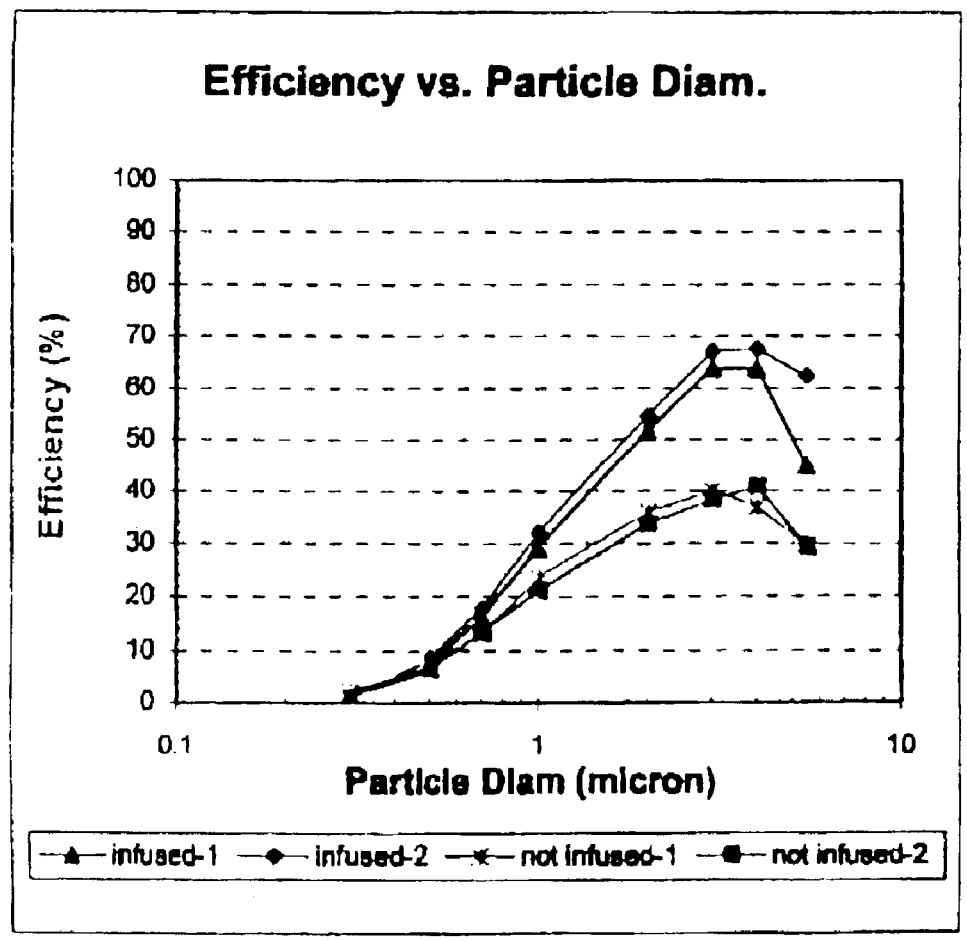
FIG. 2 is a graph showing removal efficiency for filters in accordance with the invention as compared with a prior art control filter, where the aerosol filtered is based on neutralized potassium chloride.

In this test 19"×20"×2" pleated polypropylene media filters were utilized. Filters modified in accordance with the invention, and unmodified (control) filters were challenged with neutralized potassium chloride at a flow rate of 1200 cfm. The potassium chloride was present as a dispersed powder consisting of uncharged particles in the 0.1 to 10 $\mu$m range. The modified filters were prepared generally as in Example 1. The VET absorbent composition added to the filter was at a weight percent of less than 1, and the absorbent composition was formulated with safflower oil rather than linseed oil as in Example 1. Also curing was expedited by use of actinic radiation. The average pore diameter in the filter was 5 $\mu$m. The modified filters exhibited approximately 25% increased efficiency without any significant increase in $\Delta P$. See FIG. 2.

Figure 3:
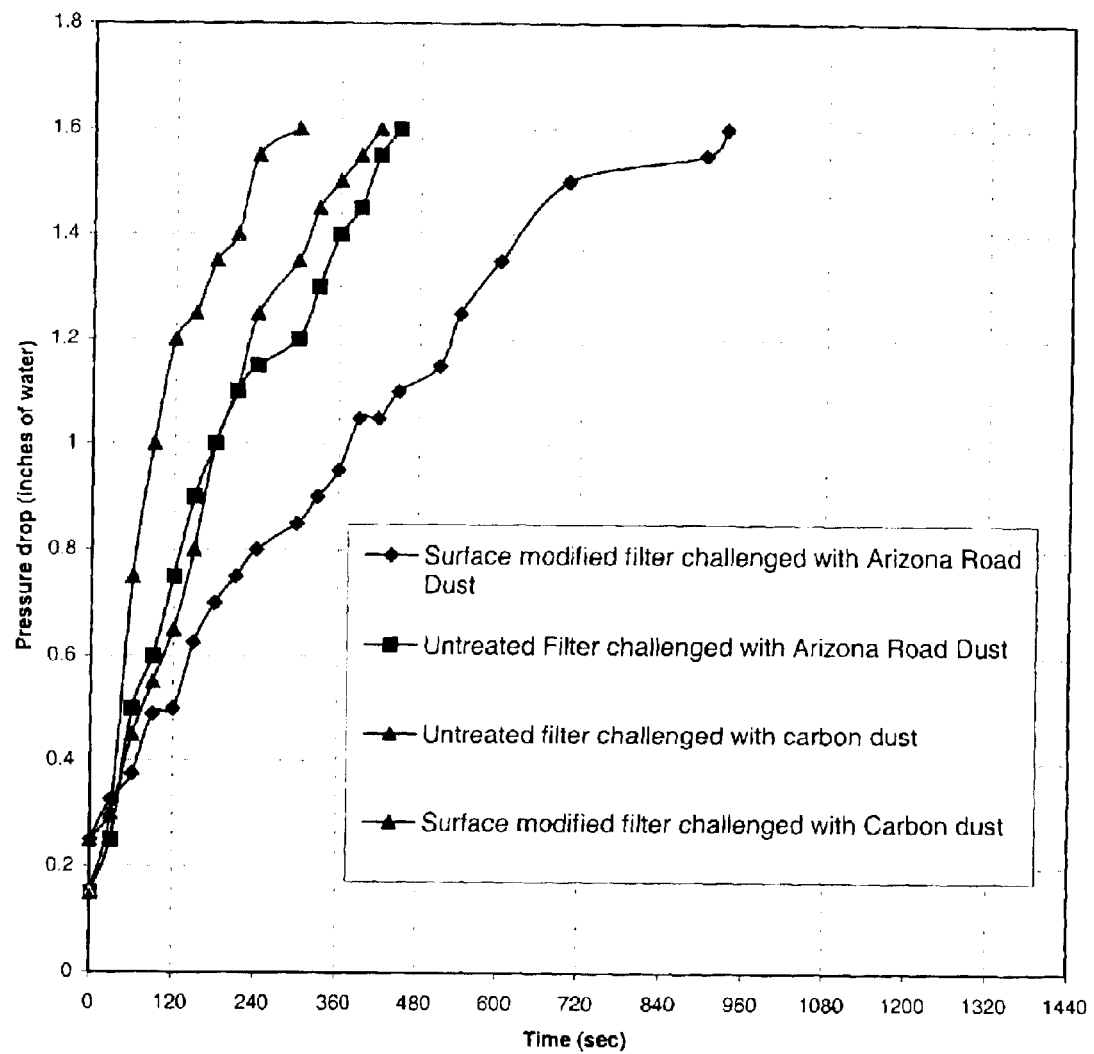
FIG. 3 is a graph similar to FIG. 2, but comparing the time for ΔP to rise to given levels for filters in accordance with the invention and for prior art control filters, where two different air-dispersed particulates i.e., aerosols are filtered.

These tests were duplicated with 1–10 $\mu$m Arizona Road Dust and with Granular Carbon (carbon dust). Table. 1 and FIG. 3 illustrate the comparison of pressure drop characteristics as between surface modified filters in accordance with the invention and unmodified filters on dust absorption (for two different dusts) to the same $\Delta P$. As Table 1 illustrates, modified filters absorb significantly more dust to the $\Delta P$ compared to unmodified filters. Additionally the rate of increase of $\Delta P$ is more gradual than with an unmodified filter. These results are significant because they indicate that practically any filter can be modified in this way resulting in increased efficiency without any substantial $\Delta P$ cost.

TABLE 1

|  | Surface modified filter | Unmodified filter |
| --- | --- | --- |
| Amount of Arizona Road Dust absorbed to constant pressure drop of 1.6 inches of water | 50.09 g | 14.16 g |
| Amount of Carbon Dust absorbed to constant pressure drop of 1.6 inches of water | 22.6 g | 8.33 g |

In both the cases surface modified filters of the invention retain much more particulate matter to the same pressure drop.

EXAMPLE 4

Mixed Aerosol Filtration

Surface modified and unmodified filters were prepared as in Example 3 and evaluated with the following waste streams:

(a) Arizona Road Dust (b) Methyl salicylate oil mist and Arizona Road Dust (c) Silicone oil mist and Arizona Road Dust (d) Finely ground mixture of Silicone oil and Arizona Road Dust.

In Part 1 of these evaluations both surface modified and unmodified filters were sequentially challenged with either methyl salicylate or silicone oil and then challenged with Arizona Road Dust. Part 2 of the experiment challenged surface modified and unmodified filters with Arizona Road Dust which had silicone oil ground into it. The results are as indicated in Table. 2, and in FIGS. 4 and 5.

TABLE 2

| | Surface Modified filter | Unmodified filter |
|---|---|---|
| Amount of Arizona Road Dust absorbed by the filter to a constant pressure drop of 1.6 inches of water when challenged with Arizona Road Dust alone. | 7.53 g | 3.42 g |
| Amount of oil mist/Dust absorbed by the filter to a constant pressure drop of 1.6 inches of water when sequentially challenged with Methyl salicylate oil mist and Arizona Road Dust | 6.65 g | 3.81 g |
| Amount of oil mist/Dust absorbed by the filter to a constant pressure drop of 1.6 inches of water when sequentially challenged with Silicone oil mist and Arizona Road Dust | 7.87 g | 4.05 g |
| Amount of Particulate Dust absorbed by the filter to a constant pressure drop of 1.6 inches of water when challenged with finely ground mixture of Arizona Road Dust and Silicone oil. | 4.82 g | 3.05 g |

Figure 4:
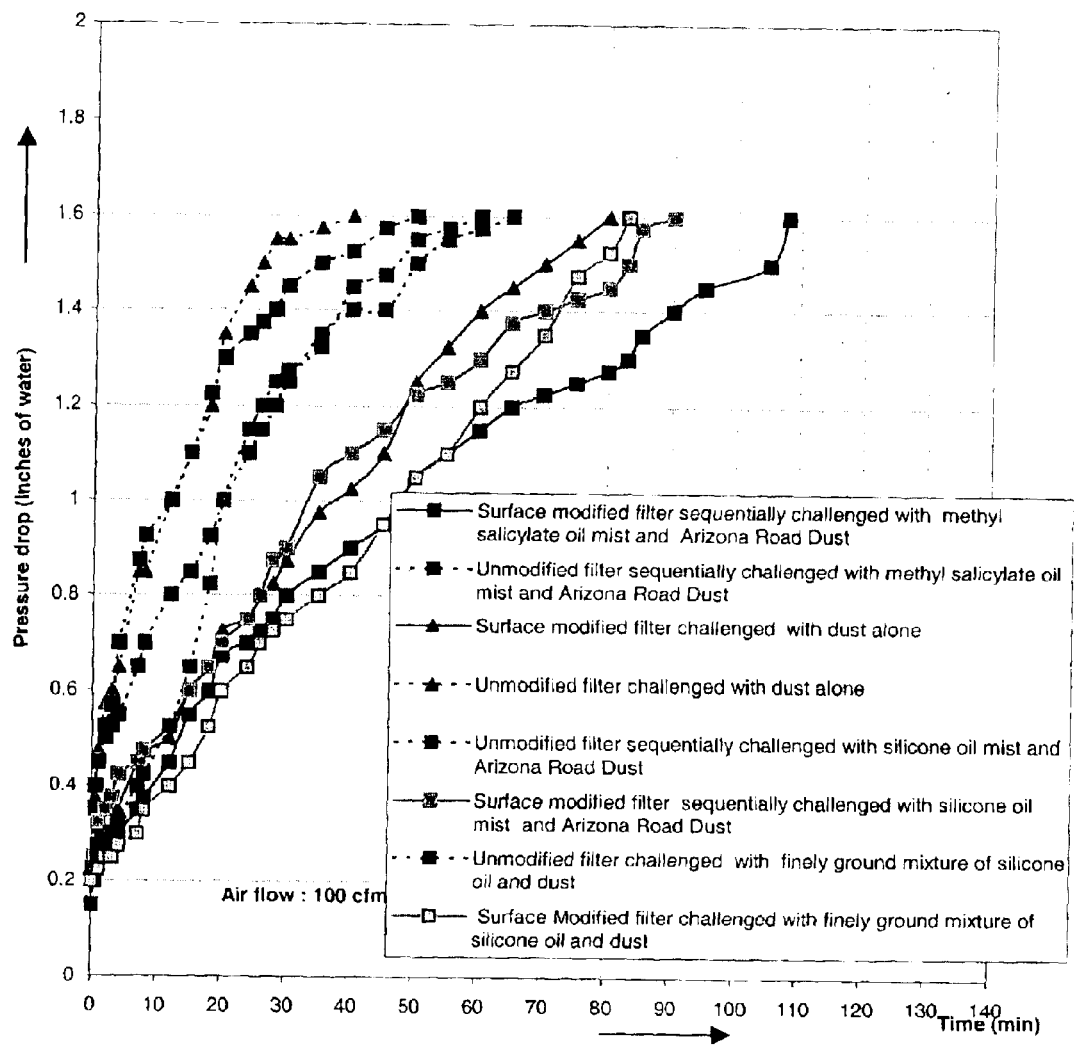
FIG. 4 is a graph similar to FIG. 2, but comparing the time for ΔP to rise to given levels for filters in accordance with the invention and for prior art control filters, where various mixed aerosols are filtered.
Figure 5:
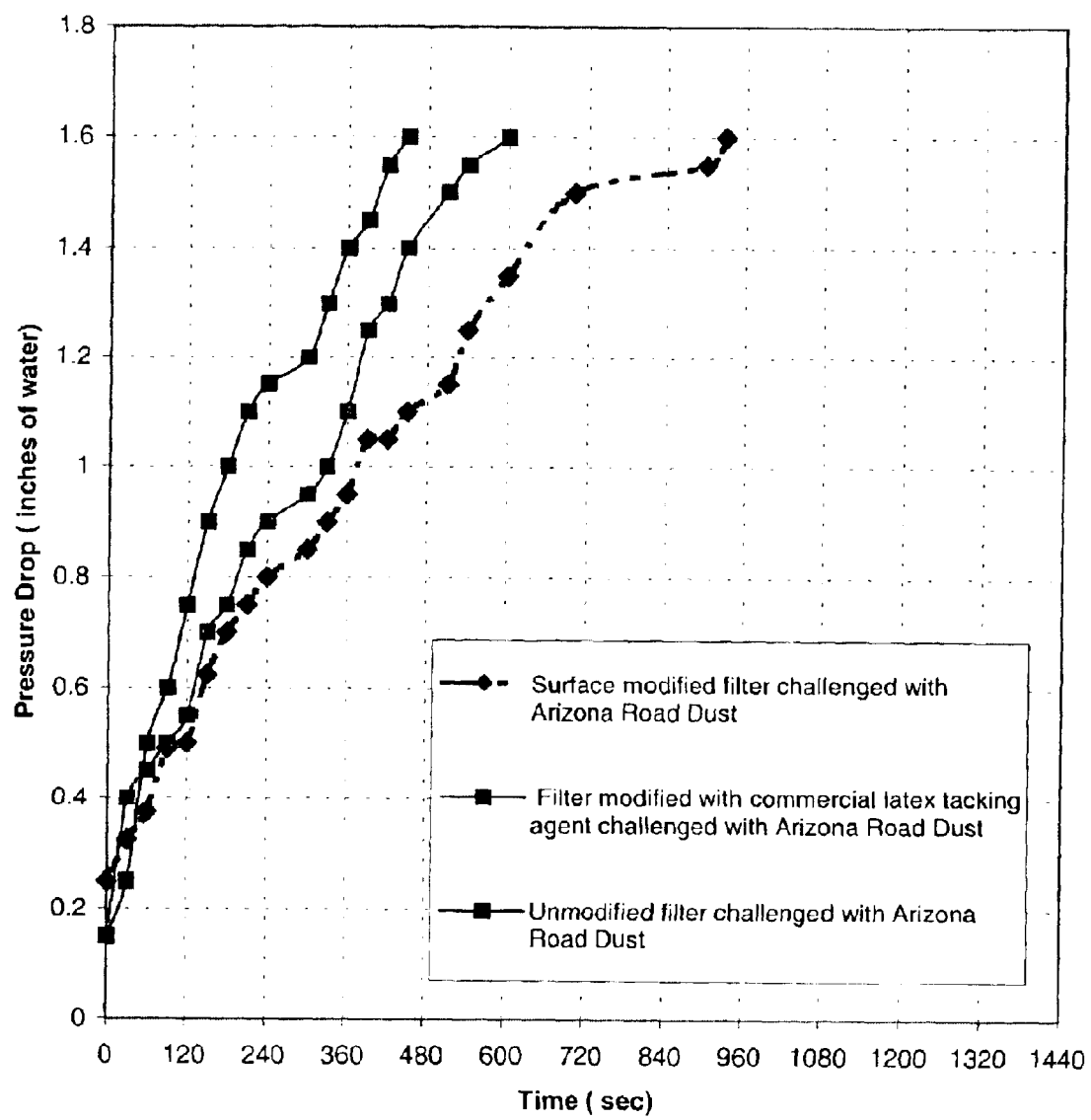
FIG. 5 is a graph similar to FIG. 3, but comparing the time for ΔP to rise to given levels for filters in accordance with the invention, for a control filter not treated as in the invention, and for a filter modified with a conventional latex tacking agent.

Table 2, and FIGS. 4 and 5 illustrate the comparison between surface modified and unmodified filters on dust absorption to same ΔP and pressure drop characteristics respectively.

Figure 6:
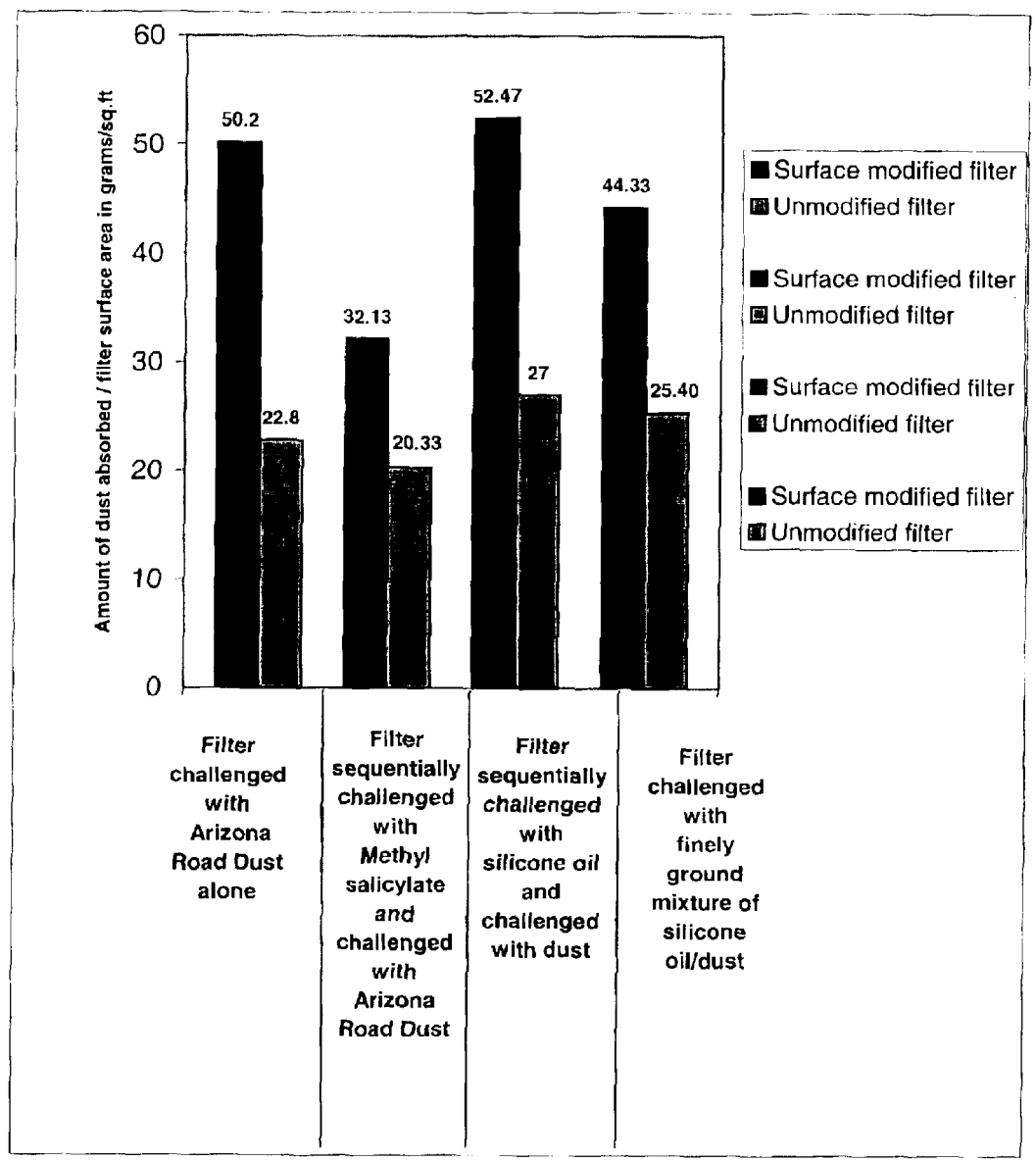
FIG. 6 is a bar plot illustrating the amount of particulate dust/oil aerosol absorbed/filter surface area to a specified constant pressure drop, for filters in accordance with the invention as compared to prior art control filters.

In all cases the surface modified filters in accordance with the invention absorbed approximately twice as much particulate matter/oil mist as unmodified (control) filters at the same pressure drop. See FIG. 6. Interestingly surface modified and unmodified filters absorb less particulate matter when challenged with an oily mist.

While the present invention has been described in terms of specific embodiments thereof, it will be understood in view of the present disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

I claim:

1. A method for separating undesired particles from a gaseous medium in which the particles are dispersed, comprising:

passing the said gaseous medium and particles through a fluid-pervious filtration media which has been treated with an absorbtion composition cured in situ at the media, said composition comprising a homogeneous thermal reaction product of an oil component selected from the group consisting of glycerides, fatty acids, alkenes, and alkynes, and a methacrylate or acrylate polymer component; said particles being thereby immobilized at said media; and flowing the purified gaseous medium having passed through said filtration media to a discharge or utilization point.

2. A method in accordance with claim 1, wherein said particles are suspended in said gaseous medium to form an aerosol, said aerosol being passed through said filtration media to separate said particles.

3. A method in accordance with claim 1, wherein said absorbtion composition has been applied to and modified surfaces of said filtration media.

4. A method in accordance with claim 1, wherein the gaseous medium is air.

5. A method in accordance with claim 2, wherein the gaseous medium is air.

6. A method in accordance with claim 1, wherein the particles are liquid droplets.

7. A method in accordance with claim 2, wherein the aerosol particles are liquid droplets.

8. A method in accordance with claim 1, wherein the particles comprise solids.

9. A method in accordance with claim 2, wherein the aerosol particles comprise solids.

10. A method in accordance with claim 2, wherein the aerosol particles are of less than 100 $\mu$m in diameter.

11. A method in accordance with claim 2, wherein the aerosol particles comprise solid particles which are coated or enveloped in a liquid.

12. A method in accordance with claim 10, wherein at least 40% by weight of the particles are of less than 0.2 $\mu$m in diameter.

13. A method in accordance with claim 1, wherein the said filtration media comprises a nonwoven polypropylene.

14. A method in accordance with claim 1, wherein the said filtration media comprises a fibrous polyester cellulose.

15. A method in accordance with claim 1, wherein the said filtration media comprises polyethylene.

16. A method in accordance with claim 1, wherein the said filtration media comprises fiber glass.

17. A method in accordance with claim 1, wherein the said filtration media comprises a porous media impregnated with granular activated carbon.

18. A method in accordance with claim 1, wherein the said filtration media comprises a porous media impregnated with a mineral particulate.

19. A method in accordance with claim 18, wherein the said mineral particulate comprises perlite.

20. A method in accordance with claim 18, wherein the said mineral particulate comprises vermiculite.

* * * * *